Figure 5A:
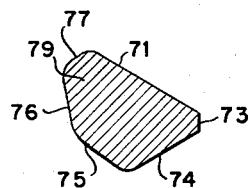
Figure 5:
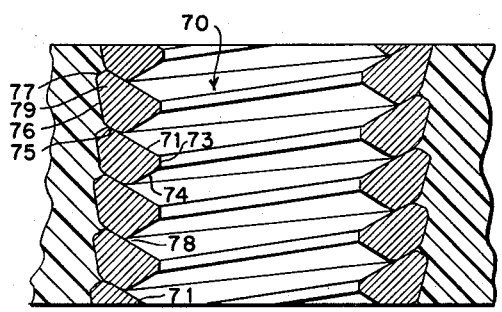

March 16, 1954     J. O. FORSTER     2,672,070
WIRE COIL SCREW THREAD INSERT FOR MOLDED MATERIAL
Filed June 10, 1953     2 Sheets-Sheet 1
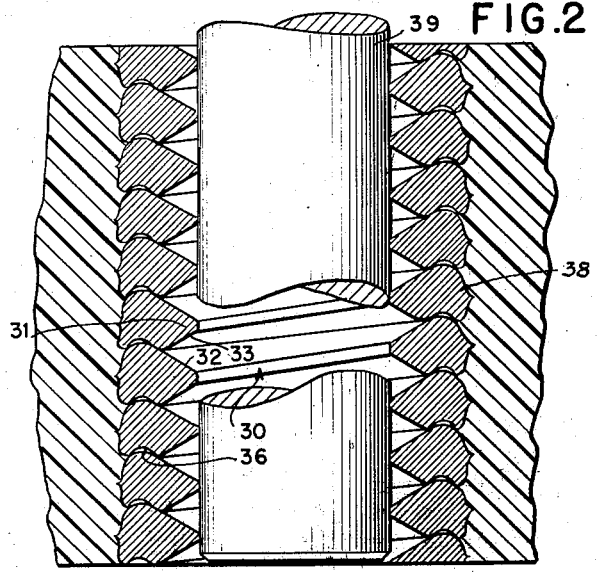
FIG.2
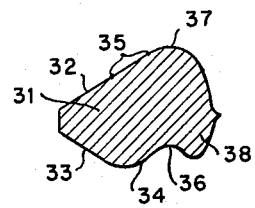
FIG.2a
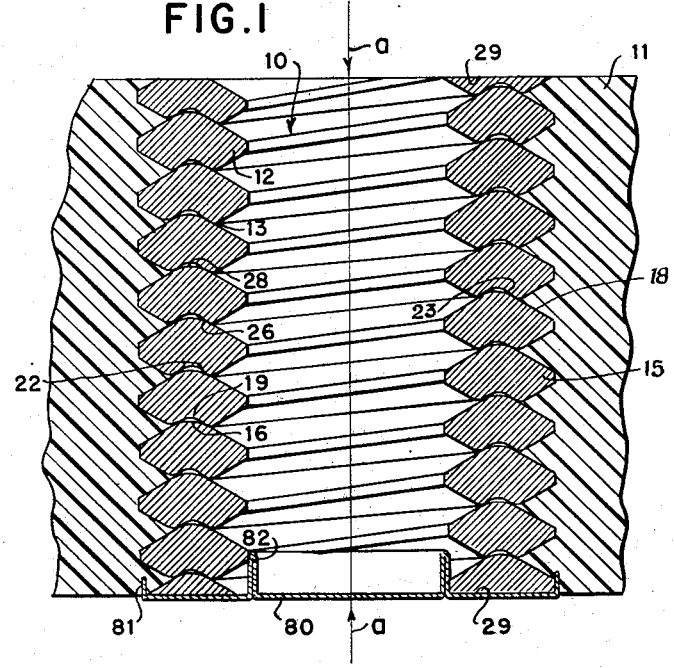
FIG.1
FIG.1a
*INVENTOR.*
John O. Forster
BY *Walter S. Pleston*
ATTORNEY March 16, 1954     J. O. FORSTER     2,672,070
WIRE COIL SCREW THREAD INSERT FOR MOLDED MATERIAL
Filed June 10, 1953     2 Sheets-Sheet 2

*INVENTOR.*
John O. Forster
BY *Walter S. Pleston*

ATTORNEY

Patented Mar. 16, 1954

2,672,070

UNITED STATES PATENT OFFICE 2,672,070

WIRE COIL SCREW THREAD INSERT FOR MOLDED MATERIAL

John O. Forster, Harrison, N. Y., assignor to Heli-Coil Corporation, Danbury, Conn., a corporation of Delaware Application June 10, 1953, Serial No. 360,714

9 Claims. (Cl. 85—32)

The invention relates to a wire coil screw thread insert for molded material. The conventional wire coils of diamond or other shape serving to provide a wear resistant screw thread in a metal boss or nut are not useful in articles of molded plastic material. If such a conventional coil would be applied after the plastic material has hardened the necessary tapping and inserting operations would be too expensive in most instances where volume production is concerned. If, on the other hand, such coils are attached to the mold into which the material is flown under high pressure while it is still liquid or softly plastic, it is practically unavoidable that some of the material passes into the interior through the interstices present between the convolutions of the conventional coils.

The invention aims to avoid this drawback, and its main object is the provision of a wire coil screw thread insert having interlocking convolutions. In the preferred form of the insert the wire is so coiled that there is an original tension tending to urge the convolutions tightly upon one another.

The invention also aims to provide a coil with convolutions in tight engagement with one another but with a hollow space between the adjacent convolutions thereby to cause a labyrinth effect preventing the passage of plastic material from the outside to the inside of the coil.

According to another object of the invention the cross-section of the coil wire is so shaped that the inner portions of the adjacent convolutions form a conventional V-thread wherein the one side of the wire flanking the thread groove is extended beyond the bottom of the groove, and the side portion opposite the flank extension is so formed that in each convolution it bears on the flank extension of the adjacent convolution and that throughout the coil there is a contact strip of more or less width which is inclined with respect to the coil axis.

Further details and objects of the invention will be apparent from the description given hereinafter, and the accompanying drawing illustrating several embodiments thereof by way of example.

In the drawing, Figs. 1 to 5 are cross-sections of five different forms of coils according to the invention, and Figs. 1a to 5a are cross-sections on a larger scale of the wires of which the coils of Figs. 1 to 5 respectively are made.

In Fig. 1 a cylindrical wire coil 10 is shown embedded in a boss 11 of plastic material. The inner portions 12 of the coil form a female thread with a thread groove 13. The cross-section of the wire of the form illustrated in Fig. 1a can be best described as being composed of two equal isoceles triangles 14 and 15 on a common base b indicated by a dotted line. At the one end 16 of the base, the corner formed by the sides 17 and 18 of the triangles is slightly rounded. On the opposite end of the base, a recess 19 is provided where otherwise the continuations of the sides 20 and 21 would form a corner. It is to be noted that the recess 19 is flanked by short side portions 22 and 23 of which the side portion 22 is parallel to the side 17 of triangle 14. At 24 and 25 the points on the sides 17 and 20, respectively, are indicated which are located at the bottom of the thread groove 13 when the wire is coiled. Whereas the side 20 has its end substantially at the point 25, the side 17 is extended beyond point 24 by the piece 26 which is located opposite the side portion 22 of recess 19. The corner formed by lines 17 and 20 is cut off so as to shape a narrow land 27 as conventional in standard female threads. The triangular portion 15 is symmetrical with portion 14 in respect to the base b and therefore does not require additional detailed description.

As stated hereinbefore, the wire is so coiled that there is a certain pre-tension insuring that the convolutions bear tightly the one on the other. As clearly shown in Fig. 1, in the finished coil, the rounded corner 16 of a convolution engages the recess 19 of the adjacent convolution so that the side portions 22 and 26 bear upon each other. Similarly the side portions 23 bear on the sides 18 of the adjacent convolutions. Thereby an almost solid bushing is created. However, in the form of Fig. 1, the corner 16 and the recess 19 are so shaped that there is still a small hollow space 28 between each pair of adjacent convolutions. This space has the effect of a labyrinth. It is of particular value when the coil is used with plastics which are charged in the mold in the liquid state as e. g. polystyrene, nylon and cellulose compounds. In order to embed the coil in a molded material, the coil may be attached to a mold (not shown) and held under axial pressure indicated by the arrows a—a for which purpose the end faces 29 are planed e. g. by grinding. If, then, plastic material is flown about the coil to form the boss 11 no such material while under pressure during its liquid state can spread the convolutions apart, so as to enter the interior of the coil provided of course that the axial compressions of the coil is high enough. Even if there should be any seepage, liquid plastic entering the labyrinth space 28 under its high pressure will be subject to a sudden pressure drop causing its solidification, so that the solidified plastic in the labyrinth seals the passage into the interior of the coil.

If it is intended to use the coil in a blind hole, a bottom cap 80 may be applied to the end of the coil in order to prevent material from entering from below. The cap has an outer rim 81 and an inner rim 82 which engage the coil end from the outside and the inside. The molding pressure will urge the cap tightly against the end face of the coil and seal the latter.

The coil of Fig. 1 fulfils all requirements of a screw thread insert for a molded article. The coiled wire of stainless steel or a similar material furnishes a very reliable and wear-resistant female thread, and the outer portions 15 constitute the means firmly to anchor the coil in the boss. The coil can be handled like any solid thread bushing, over which it excels by its relatively light weight and smaller overall diameter.

This outer diameter can be still further reduced by decreasing the size of the outer portions as in many instances a much smaller anchoring projection than that of Fig. 1 will be sufficient.

Such a coil of smaller outer diameter is shown in Fig. 2 where it is denoted by 30. The inner coil portions 31 are shaped in the same manner as portion 14 in Fig. 1, that is to say, they form a conventional V-thread although any other desired thread form may be used. However, merely V-threads are shown herein as this type of thread is by far most commonly applied. The sides and side portions 32, 33, 34 and 35 of the cross-section of Fig. 2a correspond to the similar sides and side portions 17, 20, 22 and 26, of Fig. 1a. Side portion 34 flanks a recess 36 and side portion 35 adjoins a rounded corner 37, whereby the recess 36 and rounded corner 37 form a labyrinth space as explained herein before. Thus, the convolutions of the coil 30 interlock in the same manner as those of coil 10 in that the corner 37 of each convolution engages in the recess 36 of the adjacent convolution. However, the outer portion 38 of the coil of Fig. 2 differs from the portion 15 in that it projects much less than the latter. Its actual configuration is not very material provided it causes sufficient resistance to occurring forces as to shear and tear of the boss material. Fig. 2 also shows a pin 39 which may be a part of the mold to hold the insert in position during the molding. It will be noticed that this purpose is served by a plain cylindrical pin to which the tightly wound interlocked coil can be readily applied and from which it can be removed by a straight axial movement, whereas with an insert coil of the conventional type with spaced convolutions it is necessary to screw the coil on a threaded bolt in the mold in order to prevent the passage of plastic material into the interior of the coil, and to unscrew the bolt from the coil after the molding. This necessity and the complicated and expensive operations involved had rendered the application of the conventional wire coil insert impractical in molded plastic articles. The coils according to the invention avoid the difficulties hitherto encountered.

Figure 3A:
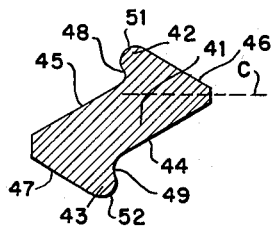
Figure 3:
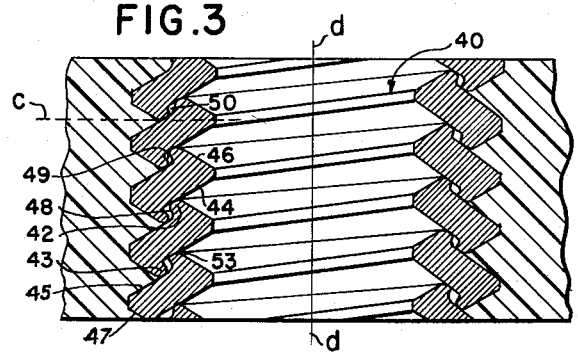

Another coil 40 of a wire cross-section having excellent interlocking properties is illustrated in Figs. 3 and 3a. This wire cross-section is of a shape similar to the letter Z, consisting of a web portion 41 and oppositely directed flange portions 42 and 43, wherein the parallel faces 44 and 45 of the web are longer than the flange faces 46 and 47. The wire is coiled in such a position of the cross-section that a line $c$ bisecting the angle between the sides 44 and 46 is at right angles to the axis $d$—$d$ of the finished coil 40, if the coil is destined to form a standard thread. For other thread forms the shape of the wire cross-section and the relative position of it in the finished coil will have to be correspondingly different. In the illustrated embodiment, the side portions 48 and 49 together with the sides 46 and 47 form the flanges 42 and 43 which in the finished coil enclose the labyrinth space 50. The flange corners 51 and 52 may be provided with a face parallel to the sides 44 and 45 or may be rounded as shown, in which event at least a very narrow portion of the rounding, for all practical purposes, will be parallel to the last mentioned sides. In the finished coil, the side 46 of the one convolution and the side 44 of an adjacent convolution form the thread groove 53. The convolutions are interlocked in that the end of the flange 42 bears on that portion of side 44 which does not border the groove 53. Similarly, the end of flange 43 bears on the side 45. The portion of the wire cross-section between the sides 45 and 47 constitutes the outer coil portion or projection for anchoring the coil in the plastic boss. It will be clear that in a coil of the type of Fig. 3, the interlocking of the flanges 42 and 43 with the labyrinth space therebetween will prevent plastic material to pass between the convolutions even if a very high pressure is applied during the molding.

Figure 4A:
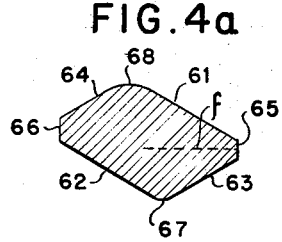
Figure 4:
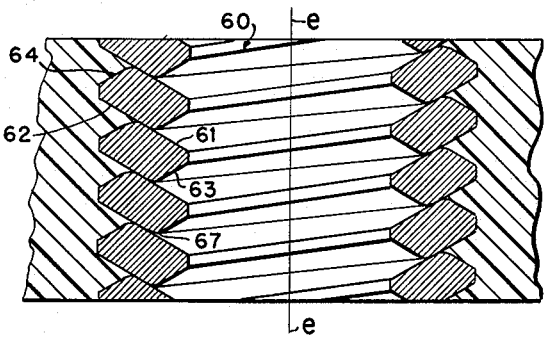

In Figs. 4 and 4a, a coil 60 with interlocking convolutions is illustrated which is useful where the plastic material at molding temperature is an elastic, viscous gelatinous mass as e. g. rubber, phenolformaldehyde, ureaformaldehyde or the like. This coil excels by the simplicity of the cross-section of the wire which is similar to a parallelogram having two longer sides 61 and 62 and two shorter sides 63 and 64. The acute corners are cut off to form the usual lands 65 and 66 and the other corners 67 and 68 may be rounded off. The coil 60 is so wound that the line $f$ bisecting the angle between sides 61 and 63 is at right angles to the coil axis $e$—$e$. The thread groove 67 is flanked by the side 63 and a portion of the side 61 equal in length to side 63. The remainder of the side 61 bears against a similar portion of the side 62 which together with the side 64 forms the anchoring projection.

As stated with respect to Figs. 1 and 2 the outer coil diameter may be reduced by a reduction of the anchoring portion. The same principle can be applied to coil 60. For this purpose, the parallelogram of the wire cross-section of Figs. 4 and 4a is reduced to a trapezoid-like shape in Figs. 5 and 5a. The cross-section of the coil 70 is, in its inner portion between the sides 71, 73 and 74, the same as the thread-forming portion between the sides 61, 65 and 63 in Fig. 4a. Side 75 opposite 71, however, is shorter than the latter, and the angle between the side 75 and the fourth side 76 is obtuse rather than acute. The corner between the sides 76 and 71 may be rounded or cut off to form a very short fifth side 77 as shown. In the coil, the thread groove 78 is formed between the side 74 and a portion of the side 71 whereas, the side 75 bears on the remainder of side 71 of the adjacent convolution. The outer projection 79 between the sides 76 and 77 serves to anchor the coil as in the cases of the other embodiments.

Thus the invention provides a wire coil screw thread insert for molded articles, wherein the coil convolutions are interlocked to prevent plastic material from penetrating into the interior of the coil. It will be apparent to those skilled in the art that many alterations and modifications of the structures illustrated and hereinbefore described are possible without departure from the essence and spirit of the invention which for that reason shall not be limited but by the scope of the appended claims.

I claim:

1. A cylindrical wire coil thread insert for use in molded articles, said wire coil consisting of a plurality of interlocking convolutions wound with tension to bear tightly upon one another, the end convolutions of the coil being planed at right angles to the coil axis, the inner portions of the convolutions being so shaped as to form a female screw thread for the engagement of a screw bolt or stud, and the outer portions of the convolutions forming a helical projection to anchor the coil in a plastic material molded around the coil.

2. An insert as claimed in claim 1, wherein the adjacent, tightly wound convolutions enclose a hollow space which extends helically from the one to the other end of the coil.

3. A cylindrical wire coil thread insert for use in molded articles, said wire coil consisting of a plurality of interlocking convolutions bearing tightly upon one another, the end convolutions of the coil being planed at right angles to the coil axis, the inner portions of the convolutions having inclined flanks so as to form a female thread for the engagement of a screw bolt or stud, the outer portions of the convolutions forming a helical projection to anchor the coil in a plastic material molded around the coil, the one of said inclined flanks extending beyond the bottom of the groove of said female thread, and at least a narrow face portion which adjoins said other flank at said groove bottom being substantially parallel to said first mentioned flank so that said face portion of one convolution contacts said extended flank of the adjacent convolution on a helical strip inclined with respect to the axis.

4. An insert as claimed in claim 3 wherein the corner between said extended flank and the adjoining outer portion of a convolution is rounded, and the face of said convolution opposite said corner is provided with a continuous recess engaged by said corner of the adjacent convolution.

5. An insert as claimed in claim 3 wherein the inner and outer portions of the wire cross-section are symmetrical with respect to a common base, the corner at the one end of said base being slightly rounded and a recess being provided at the other end of said base so as to form a helical groove throughout the coil, said rounded corner of each convolution engaging said helical groove of the adjacent convolution.

6. An insert as claimed in claim 3 wherein the cross-section of said wire is substantially Z-shaped, the web of said Z being inclined with respect to the axis of said coil, the one flange of each convolution being interlocked with the oppositely directed flange of the adjacent convolution.

7. An insert as claimed in claim 3 wherein the wire cross-section is substantially parallelogram shaped, said parallelogram having a pair of longer sides and a pair of shorter sides and being so inclined with respect to the axis of said coil, that one longer side of each convolution and one shorter side of the adjacent convolution form the groove of said female thread.

8. An insert as claimed in claim 3 wherein the cross-section of said wire is substantially trapezoidal, said trapezoid being so inclined so inclined with respect to the axis of said coil, that the longest side of said trapezoid of each convolution and a short side of said trapezoid of the adjacent convolution form the groove of said female thread.

9. A coil as claimed in claim 3, wherein the wire is coiled with pre-tension so that the convolutions in the finished coil bear tightly upon one another.

JOHN O. FORSTER.

References Cited in the file of this patent

UNITED STATES PATENTS

| Number | Name | Date |
| --- | --- | --- |
| 2,439,685 | Findley | Apr. 13, 1948 |
| 2,607,259 | Forster | Aug. 19, 1952 |